June 14, 1960 K. H. ANTHONY 2,940,157
TOW HANDLING APPARATUS
Filed April 27, 1956 2 Sheets-Sheet 2

Inventor:
Kenneth H. Anthony,
by Thomas N. Magner
His Attorney.

United States Patent Office 2,940,157
Patented June 14, 1960

2,940,157

TOW HANDLING APPARATUS

Kenneth H. Anthony, Willowick, Ohio, assignor to Industrial Rayon Corporation, Cleveland, Ohio, a corporation of Delaware Filed Apr. 27, 1956, Ser. No. 581,207

2 Claims. (Cl. 28—1)

This invention relates to tow handling apparatus and, more particularly, to apparatus for laying tow onto an endless belt prior to its entry into a treating or processing area.

Where filamentary tow materials are to be delivered in continuous form through a processing area the matter of laying a tow evenly and compactly onto an endless belt is desirable. Uniformity and completeness of processing insures a final material having standard characteristics. Various apparatuses have been devised and proposed for laying of relatively large sized tows. These proposals generally are directed to the use of traversing guides or oscillating laying chutes, or pivoted funnel-like guides that rotate back and forth, or oscillating draw or feed rollers, laying a tow onto an endless belt, or into containers. In the handling of heavy tows, it has been found desirable to control the tow in a positive manner to about the point of laying on a conveying or traveling surface such as an endless belt to avoid undesirable looping or whipping at reversals. Such control of the tow substantially eliminates varying feed, also possible jamming in a laying chute or in a guide and a more improved spreading of tow on a wider moving surface.

The applicant's tow handling and laying apparatus advantageously provides for a positive, more simple and continuously constant feed and laying of the tow onto an endless belt prior to entry into a treatment area. More specifically, at least two tows of several hundred thousand deniers each can be handled simultaneously by the apparatus of this invention, each being laid in a generally parallel fashion, at a constant rate and with a minimum of disturbance at reversing points. The tows are laid in a generally uniform manner, in compact form, utilizing more efficiently all of the available space on a belt carrying them into a processing area for subsequent treatments, such as washing, then drying.

The apparatus of the invention comprises substantially low-positioned, opposing pairs or units of uni-directional, rotating, tow drawing and laying rollers, driven by a common power source, moving on lateral guides across the width of an endless belt. Reciprocation of the laying roller unit is effected by means of a cam and, since the rollers are uni-directional, they rotate only one way so that the tow is laid continually generally transversely onto the moving belt below them.

The invention will be more completely understood from the following detailed description and the drawing where:

Figure 1:
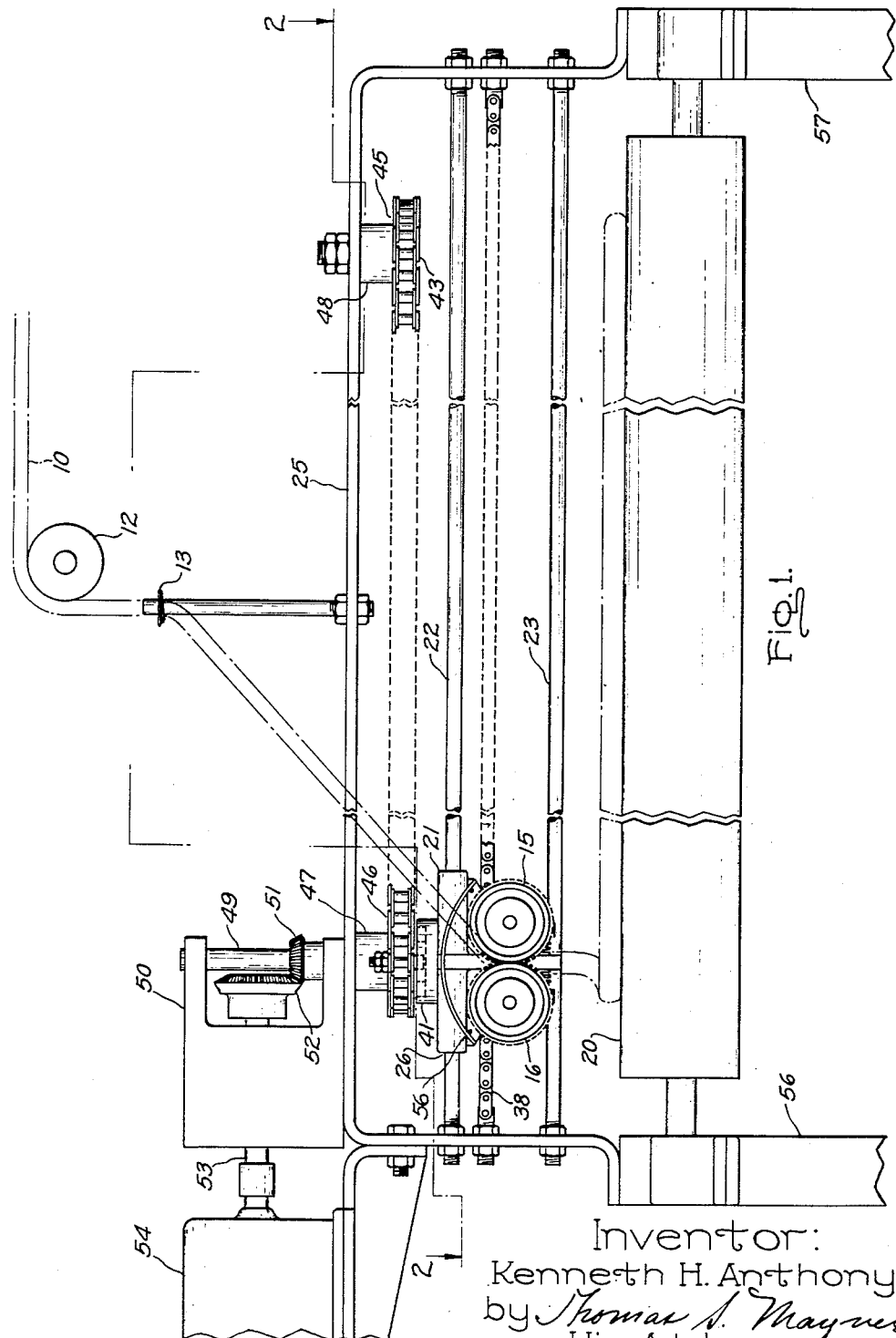
Figure 1 represents, in elevation, the tow handling and laying apparatus.

Referring to the drawing, a pair of simultaneously drawn tows 10, 11 each formed by combining a plurality of yarns drawn from creel mounted supplies (not shown) pass over an idler roller 12 then through laterally spaced guides 13, 14 mounted on the support frame 25 to the pairs, or units, of drawing rolls 15, 16 and 17, 18. The tows 10, 11 are drawn by the roller units and laid onto a transversely moving belt 20 below them.

The draw and lay rolls 15, 16 and 17, 18 are supported in a carriage 21 which is slidably mounted for back and forth movement along a pair of supporting vertically spaced guide rods 22, 23. The guide rods 22, 23 are positioned in the main support frame 25, their ends extending through the frame being secured therein by their threaded extensions and lock nuts, as generally shown. The sleeve 26 in the carriage 21 moves along the upper guide rod 22. A lower, longitudinally extending recess 27 is provided for the receipt of the lower stabilizing guide rod 23. Thus supported on the guide rods 22, 23 the carriage 21 is adapted to be slidably moved in a reciprocating or back and forth movement from one side of the frame 25 to the other. With the frame 25 positioned astride a moving belt 20 tow is laid in a transverse manner in as close generally parallel turns as desired.

Figure 2:
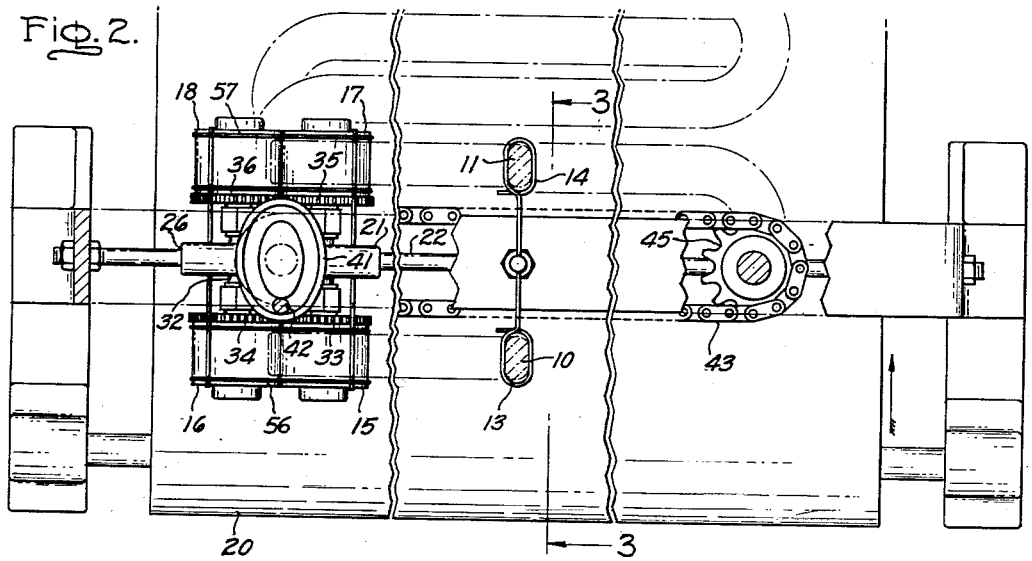
Figure 2 represents, in plan, the same apparatus taken sectionally across line 2—2 of Figure 1.
Figure 3:
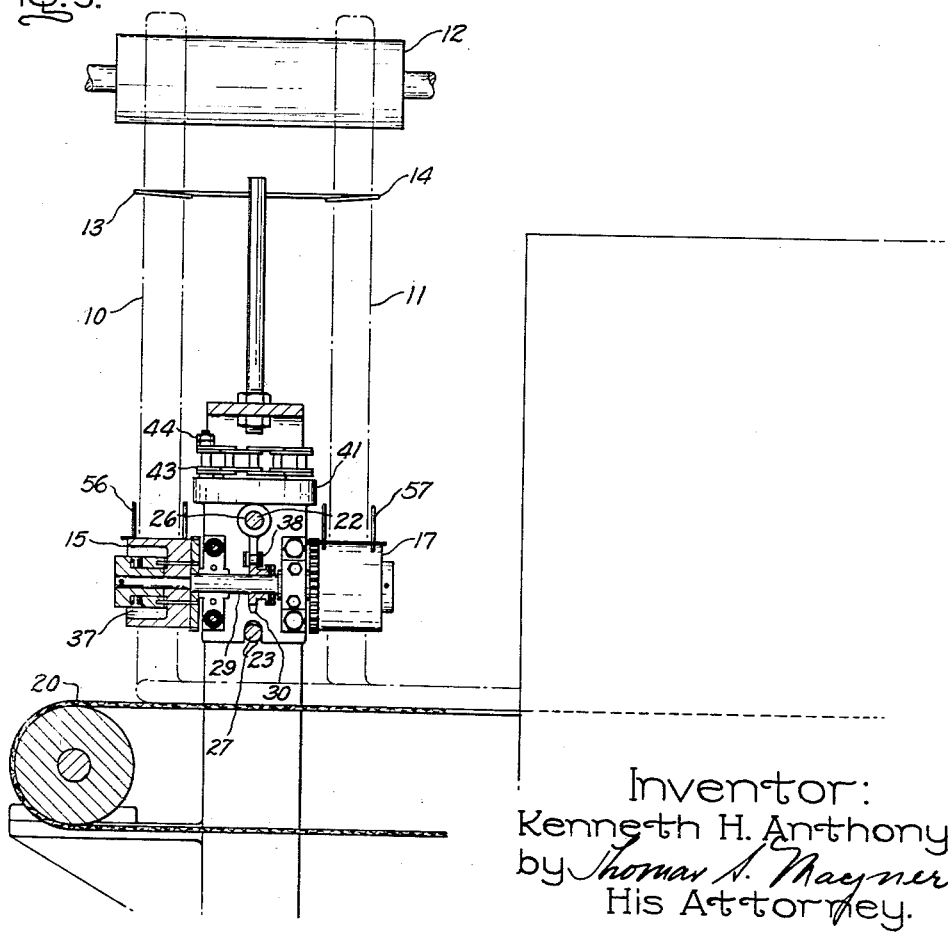
Figure 3 represents an end view of the apparatus, the section being taken across line 3—3 of Figure 2.

As shown in Figures 2 and 3, the rolls 15 and 17 are mounted on opposite ends of the shaft 29 which also supports a driving gear 30. Gear 30, being fixed to the shaft 29 will drive, upon rotation, the opposing rolls 15, 17. The companion rolls 16, 18 are similarly actuated and mounted for free rotation on shaft 32; however, these rolls are driven by means of annular gears 33, 35 attached to the driven rolls 15, 17 which, being in meshing relation with similar annular gears 34, 36, drive the oppositely positioned rolls 16, 18. So that the draw roll units continue to pull tow irrespective of direction each roll has within its interior a uni-directional clutch 37 of the contracting or expanding spring type, as generally shown in Figure 3. This type of clutch is well-known in the industry. Of course other types of uni-direction clutches, such as a sprag type, may be equally well utilized.

The rotation of the roll units is effected by the gear 30 which is mounted on the common shaft 29 also supporting the rolls 15, 17. The gear 30 is in meshing and driving contact with the longitudinally extending rack or link chain 38, also secured to the frame 25 at its sides by the usual means of attached supporting threaded stud bolts and nuts, as shown. Thus lateral motion along the guide rods 22, 23 and along the link chain or rack 38 will cause the rotation of the driving gear 30, the common shaft 29 and the pairs of draw rolls. With oppositely acting one-way clutches 37 in each draw roll 15, 16 and 17, 18 and since each pair is interconnected by intermeshing gears 33, 34 and 35, 36 any movement of the carriage 21 is translated into a positive movement of the draw rolls. Thus a movement of the carriage 21 in one direction effects a gripping of internal clutches 37 of shaft mounting the draw rolls causing one of the rolls to rotate and then through the associated intermeshed gears the other also. Upon a reversal the first holding clutches release and the second take a shaft hold to continue the rotation of the draw rolls in a positive direction. Despite reversals the uni-directional clutches cause each pair of rollers to rotate only in the desired tow drawing direction.

The lateral or transverse motion of the draw rolls 15, 17 and 16, 18 is had by means of a cam and a follower therein, the follower being attached to an endless roller chain as will be immediately hereafter explained. The cam 41 (see Figure 2) is contained in the surface of the carriage 21. The cam 41 has an elliptical groove in its body. A follower 42, which may be a roller about a pin, is attached to the roller chain 43 by some suitable means as lock nuts 44. The roller chain 43 rotates about a pair of horizontally spaced gears 45, 46 which are rotatably supported in sleeves 47, 48 attached to the main frame 25 either by a weld or threaded studs and lock nuts, as generally shown. The gear 46 is fixed to one end of a vertical shaft 49 that also extends vertically beyond the frame 25 through a yoke structure 50. A gear 51 is fixed about the vertical shaft 49 within the yoke structure 50, being positioned therein in driving relation with gear 52 mounted on the power shaft 53 driven by the motor 54. The second horizontally spaced roller chain supporting gear 45 is mounted in sleeve 48 so as to rotate freely. The rotation of the vertical shaft 49 by the motor 54 through gear 52 rotates gear 46 and the drive chain 43 and, as a result, the cam follower 42 in cam 41 reciprocates the carriage 21.

Cage guards 56, 57 are provided on the carriage 21, positioned above the draw roll units, to prevent the possible slipping out of the tows 10, 11 from between the draw rolls as the carriage moves back and forth across the belt 20.

Advantageously the carriage 21 is positioned near the surface of the moving belt 20. A clearance sufficient to avoid contact with the tow on reversals is desirable. A minimum spacing provides for better control, elimination of whip and, should it be required, an overlay or build-up in the depth of tow on a moving belt. The apparatus is adaptable to traversing any width of belt should a greater length of tow for processing be required since it is readily seen that it can be easily lengthened yet perform as advantageously.

A preferred embodiment of the invention has been herein described; however, it is to be understood that changes and variations can be made without departing from the scope and the spirit of the invention as defined in the following claims:

What is claimed is:

1. A tow handling apparatus comprising, a support, gears mounted in said support, an endless roller chain positioned about said gears, guiding means in said support adjacent said roller chain, draw rolls, a carriage mounted on said guiding means for slidable movement therealong, a cam in said carriage, a cam follower supported by said roller chain being in contact with said cam, said carriage being reciprocated upon movement of said roller chain, oppositely acting uni-directional clutches in each draw roll, said draw rolls mounted in said carriage gearing interconnecting said draw rolls, a shaft in said carriage mounting said draw rolls, a gear on said shaft, means for rotating said gear, and means for actuating said roller chain supporting gears to therethrough reciprocate said carriage on said guiding means and said draw rolls.

2. A tow handling apparatus comprising, a support, gears positioned in said support, an endless roller chain positioned about said gears for rotation about them, guiding means in said support adjacent said roller chain, draw rolls, a carriage mounted on said guiding means for slidable movement therealong, a cam supported by said carriage, a cam follower supported by said roller chain being in contact with said cam, said carriage being reciprocated upon movement of said roller chain, oppositely acting uni-directional clutches in each of said draw rolls, said draw rolls positioned in said carriage, a shaft supported by said carriage mounting said draw rolls, a gear on said shaft, a length of roller chain in which said gear rides positioned in said support, and means for actuating said endless roller chain to therethrough reciprocate said carriage and said draw rolls.

References Cited in the file of this patent

UNITED STATES PATENTS

| 267,513 | Gessner | Nov. 14, 1882 |
| 844,741 | Petterson et al. | Feb. 19, 1907 |
| 1,138,567 | Howe | May 4, 1915 |
| 2,428,709 | Hlavaty | Oct. 7, 1947 |

FOREIGN PATENTS

| 10,454 | Great Britain | of 1895 |
| 13,173 | Great Britain | of 1900 |